(12) United States Patent
Horiuchi et al.

(10) Patent No.: US 11,127,545 B2
(45) Date of Patent: Sep. 21, 2021

(54) KEYBOARD DEVICE

(71) Applicant: Chicony Electronics Co., Ltd., New Taipei (TW)

(72) Inventors: Mitsuo Horiuchi, New Taipei (TW); Chia-Hsin Chen, New Taipei (TW); Chi-Hung Cheng, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 223 days.

(21) Appl. No.: 16/586,317

(22) Filed: Sep. 27, 2019

(65) Prior Publication Data

US 2020/0328048 A1 Oct. 15, 2020

Related U.S. Application Data

(60) Provisional application No. 62/831,770, filed on Apr. 10, 2019.

(30) Foreign Application Priority Data

May 29, 2019 (TW) ................. 108118611

(51) Int. Cl.
| | |
|---|---|
| *H01H 13/86* | (2006.01) |
| *H01H 13/703* | (2006.01) |
| *H01H 13/704* | (2006.01) |
| *G06F 1/16* | (2006.01) |
| *H01H 13/70* | (2006.01) |
| *G06F 3/02* | (2006.01) |

(Continued)

(52) U.S. Cl.
CPC ........... *H01H 13/70* (2013.01); *G06F 3/0202* (2013.01); *H01H 13/705* (2013.01); *G05G 1/02* (2013.01); *H01H 2209/012* (2013.01); *H01H 2223/056* (2013.01); *H01H 2229/064* (2013.01)

(58) Field of Classification Search
CPC combination set(s) only.
See application file for complete search history.

(56) References Cited

U.S. PATENT DOCUMENTS

| | | | |
|---|---|---|---|
| 6,174,097 B1 * | 1/2001 | Daniel .................. | G06F 3/0221 400/472 |
| 10,782,743 B2 | 9/2020 | Kitamura et al. | |
| 2018/0364765 A1 * | 12/2018 | Kitamura .............. | G06F 3/0202 |

FOREIGN PATENT DOCUMENTS

TW 201905953 A 2/2019

* cited by examiner

*Primary Examiner* — Curtis A Kuntz
*Assistant Examiner* — Jerold B Murphy
(74) *Attorney, Agent, or Firm* — Muncy, Geissler, Olds & Lowe, P.C.

(57) ABSTRACT

A keyboard device includes a substrate and keycaps disposed on the substrate. The substrate includes a long slit and an elastic bridge component. The long slit divides the substrate into a first plate having a first side edge and a second plate having a second side edge opposite to the first side edge. A gap is between the first side edge and the second side edge. The elastic bridge component is connected between the first side edge and the second side edge. The first plate is movable relative to the second plate. The first side edge includes two first bridge connections. The second side edge includes two second bridge connections. The elastic bridge component includes a first elastic bar connected between the first bridge connections, a second elastic bar connected between the second bridge connections, and a connecting member connected between the first elastic bar and the second elastic bar.

25 Claims, 9 Drawing Sheets

(51) Int. Cl.
*H01H 13/705* (2006.01)
*G05G 1/02* (2006.01)

KEYBOARD DEVICE

CROSS-REFERENCES TO RELATED APPLICATIONS

This application claims the priority benefit of U.S. provisional application Ser. No. 62/831,770, filed on Apr. 10, 2019 and Patent Application No. 108118611 filed in Taiwan, R.O.C. on May 29, 2019. The entirety of the above-mentioned patent applications are hereby incorporated by references herein and made a part of the specification.

BACKGROUND

Technical Field

The instant disclosure relates to an input device, in particular, to a keyboard device.

Related Art

Keyboards are common input devices. Usually, they are used along with electronic devices, such as laptops, notebook computers, smart phones, tablets, etc.

In general, a keyboard known to the inventor(s) is provided with a base plate (substrate) for assembling with other components. For example, the base plate may comprise a plurality of assembly structures, such that a plurality of liftable connecting members can be assembled with a plurality of keycaps through the assembly structures, respectively. For instance, each of the liftable connecting members can be assembled between the corresponding keycap and the corresponding assembly structure, so that the keycaps can be supported by the liftable connecting members, and the movements of the keycaps can be guided by the liftable connecting members.

SUMMARY

However, since the base plate is a plate primarily for assembling with other components, the assembling of the keyboard device may be difficult and the overall precision of the keyboard device may be worsened if the base plate has a larger tolerance upon manufacturing.

In view of this, in one embodiment, a keyboard device is provided. The keyboard device comprises a substrate and a plurality of keycaps. The plurality of keycaps is disposed on the substrate. The substrate comprises a long slit and an elastic bridge component. The long slit divides the substrate into a first plate and a second plate. The first plate has a first side edge, and the second plate has a second side edge. The first side edge and the second side edge are opposite to each other. A gap is between the first side edge and the second side edge. The elastic bridge component is connected between the first side edge and the second side edge. The first plate is movable relative to the second plate. The first side edge comprises two first bridge connections respectively extending toward the second side edge, and the second side edge comprises two second bridge connections respectively extending toward the first side edge. The elastic bridge component comprises a first elastic bar, a second elastic bar, and a connecting member. The first elastic bar is connected between the two first bridge connections, the second elastic bar is connected between the two second bridge connections, and the connecting member is connected between the first elastic bar and the second elastic bar.

In another embodiment, a keyboard device is provided. The keyboard device comprises a substrate and a plurality of keycaps. The plurality of keycaps is disposed on the substrate. The substrate comprises a long slit and an elastic bridge component, and the long slit divides the substrate into a first plate and a second plate. The first plate has a first side edge, and the second plate has a second side edge. The first side edge and the second side edge are opposite to each other, and a gap is between the first side edge and the second side edge. The elastic bridge component is connected between the first side edge and the second side edge, and the first plate is movable relative to the second plate. The first side edge comprises two first bridge connections respectively extending toward the second side edge, and the second side edge comprises a second bridge connection extending toward the first side edge. The elastic bridge component comprises an elastic bar connected between the two first bridge connections, and the second bridge connection is connected to the elastic bar.

As above, according to one or some embodiments of the instant disclosure, the substrate is divided into a first plate and a second plate, and the elastic bridge component is connected between the first side edge of the first plate and the second side edge of the second plate. Hence, during the assembly process of the first plate and the second plate, the first plate and the second plate can be moved relative to each other and the positions of the first plate and the second plate are thus adjustable, thereby eliminating the accumulated tolerances upon manufacturing of the keyboard device. Hence, the assembly precision of the keyboard device is not affected by the manufacturing tolerance. Moreover, when the first plate and the second plate are moved relative to each other, the stress applied on the elastic bridge component can be dispersed properly, thereby preventing the elastic bridge component from being broken easily or from exceeding the elasticity limit.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
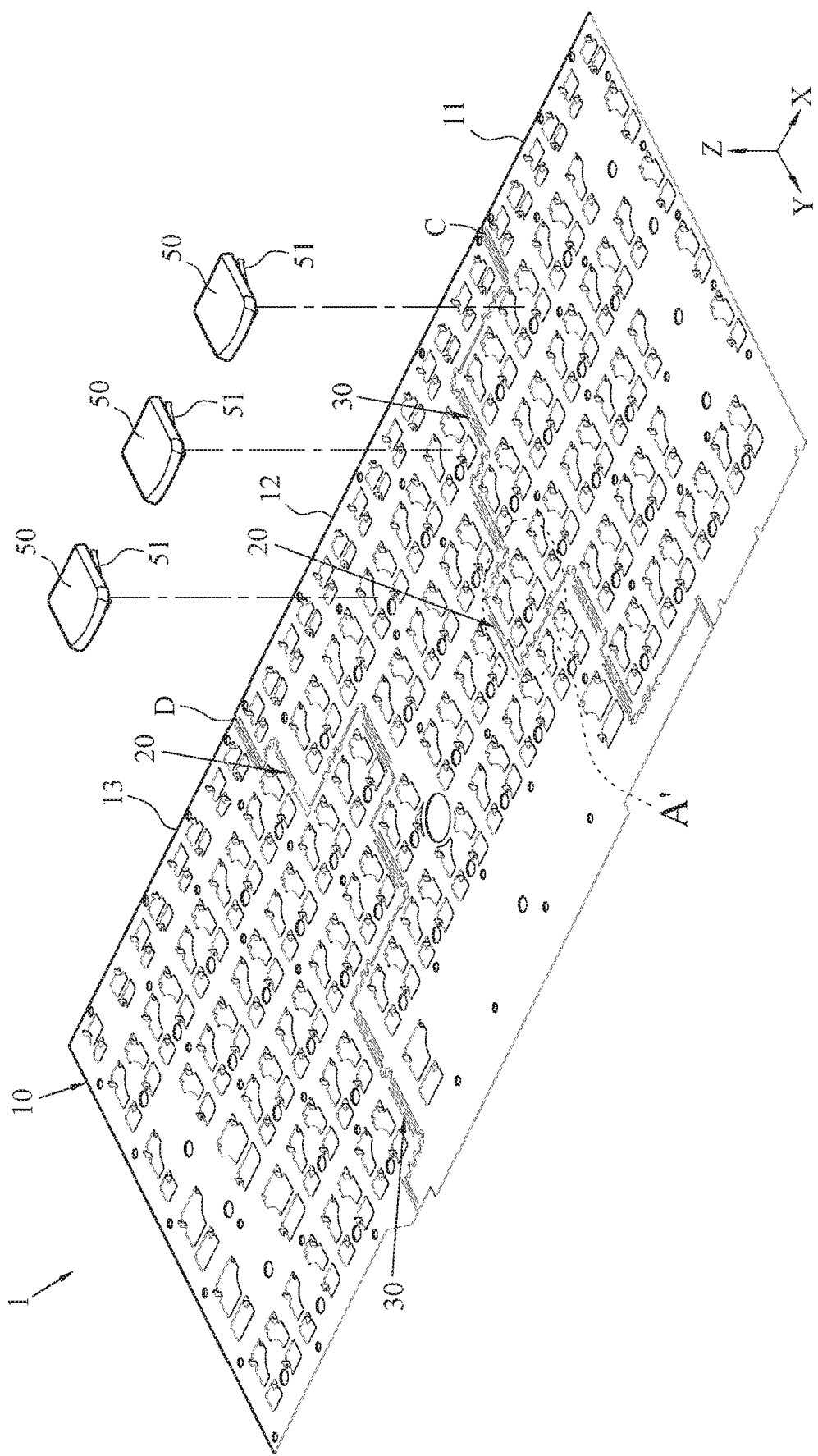
FIG. 1 illustrates a perspective view of a keyboard device according to an exemplary embodiment of the instant disclosure.
Figure 2:
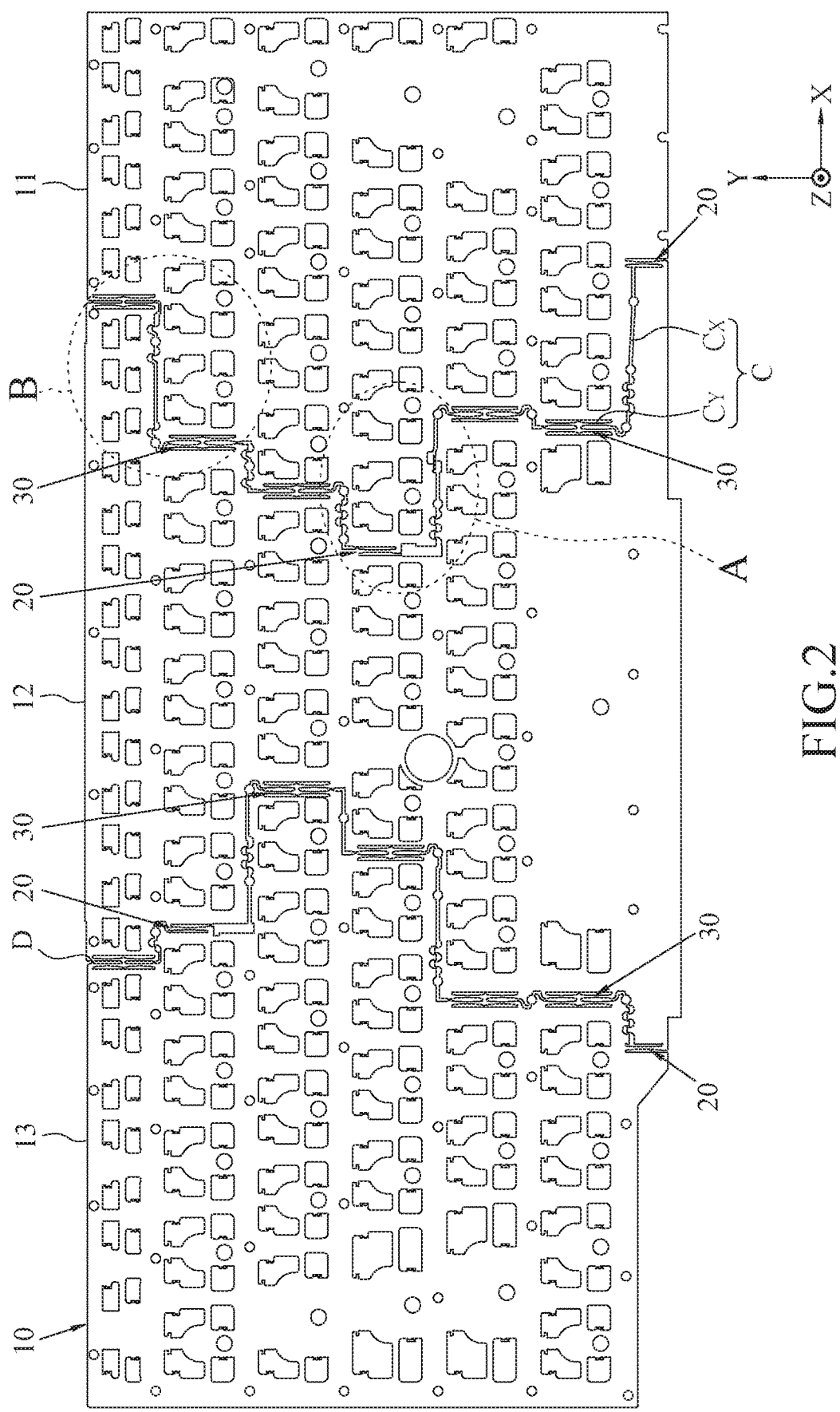
FIG. 2 illustrates a top view of a substrate according to an exemplary embodiment of the instant disclosure.

Embodiments are provided for facilitating the descriptions of the instant disclosure. However, the embodiments are provided as examples for illustrative purpose, but not a limitation to the instant disclosure. In all the figures, same reference numbers designate identical or similar elements. FIG. 1 illustrates a perspective view of a keyboard device according to an exemplary embodiment of the instant disclosure, and FIG. 2 illustrates a top view of a substrate according to an exemplary embodiment of the instant disclosure. As shown in FIGS. 1 and 2, in this embodiment, the keyboard device 1 comprises a substrate 10 and a plurality of keycaps 50. Here, the number of the plurality of keycaps 50 is three; however, the plurality of keycaps 50 may comprise a plurality of alphabet keys, a plurality of number keys, a space key, an enter key, and a caps lock key, and it is understood that these keys are omitted in the figures.

As shown in FIG. 1, in some embodiments, the substrate 10 may be a rigid plate made of metal (e.g., iron, aluminum, alloy, etc.), or plastic materials. The plurality of keycaps 50 is liftably disposed on the substrate 10, so that a user can press the keycap(s) 50 and the keyboard device 1 thus generates signal(s) corresponding to the pressed keycap(s) 50. For example, the plurality of keycaps 50 is assembled on the substrate 10 through a plurality of connecting members 51, respectively. The connecting member 51 may comprise a scissor component and an elastic member (e.g., elastic rubber, elastic piece, a mechanical switch, etc.)

As shown in FIGS. 1 and 2, the substrate 10 is on an X-Y plane of the figures, and the substrate 10 has at least one long slit C, so that the substrate 10 is divided into a plurality of plates. In this embodiment, the substrate 10 has two long slits C, D, and the two long slits C, D respectively extending in the Y axis direction shown in the figures, so that the substrate 10 is divided into three plates (here, a first plate 11, a second plate 12, and a third plate 13) arranged in the X axis direction shown in the figures; however, embodiments are not limited thereto. In some embodiments, the substrate 10 may have one long slit C, so that the substrate 10 is divided into two plates arranged in the X axis direction. Alternatively, the substrate 10 may have more than two long slits, so that the substrate 10 can be divided into four or more plates arranged in the X axis direction.

In some embodiments, the long slits C, D may be linear slits or slits with multiple segments. Taking the long slit C shown in FIG. 2 as an example, the long slit C is a slit with multiple segments, and the long slit C has several X direction sections $C_X$ and several Y direction sections $C_Y$ each connected between adjacent two X direction sections $C_X$. Each Y direction section $C_Y$ is extending in the Y axis direction (the Y direction section $C_Y$ may be parallel to the Y axis direction or not), and each X direction section $C_X$ is extending in the X axis direction (the X axis direction $C_X$ may be parallel to the X axis direction or not), but embodiments are not limited thereto. In some embodiments, each long slit C may be a linear slit extending in the Y axis direction. In this embodiment, the substrate 10 is a rectangular plate, the long side of the substrate 10 is parallel to the X direction section $C_X$, and the short side of the substrate 10 is parallel to the Y direction section $C_Y$, but embodiments are not limited thereto.

Figure 3:
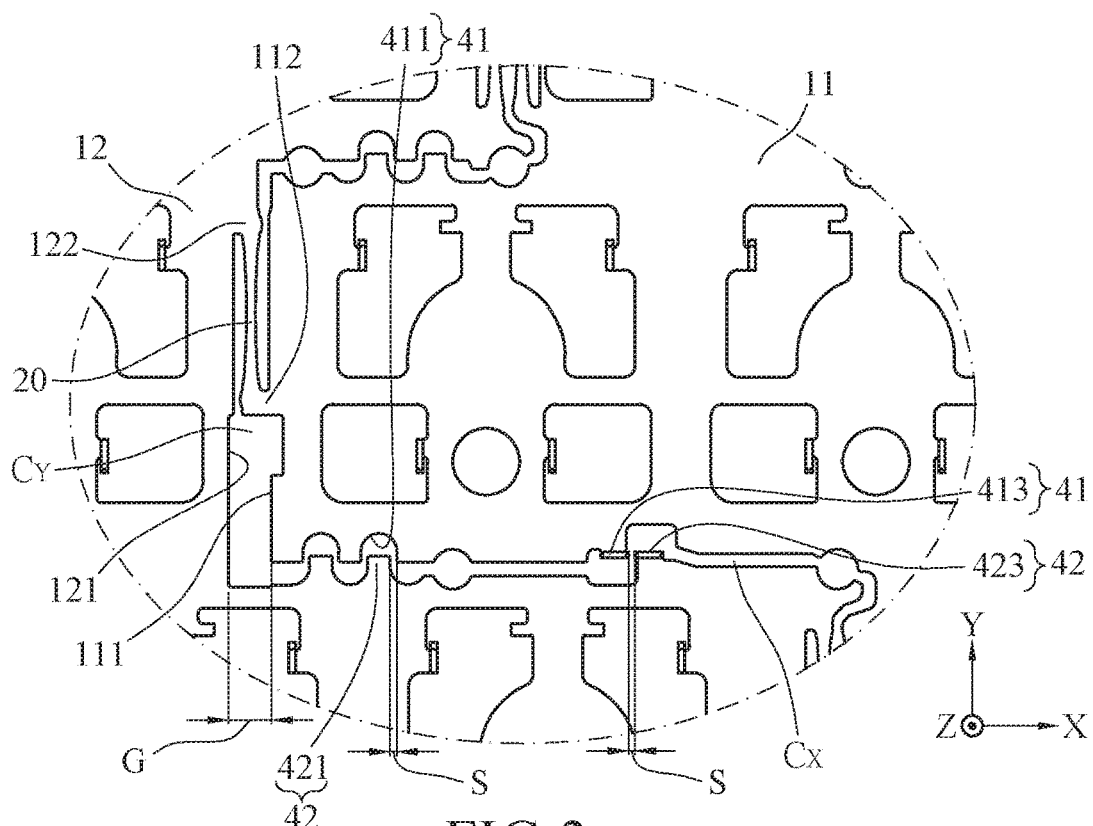
FIG. 3 illustrates an enlarged partial view of FIG. 2.
Figure 4:
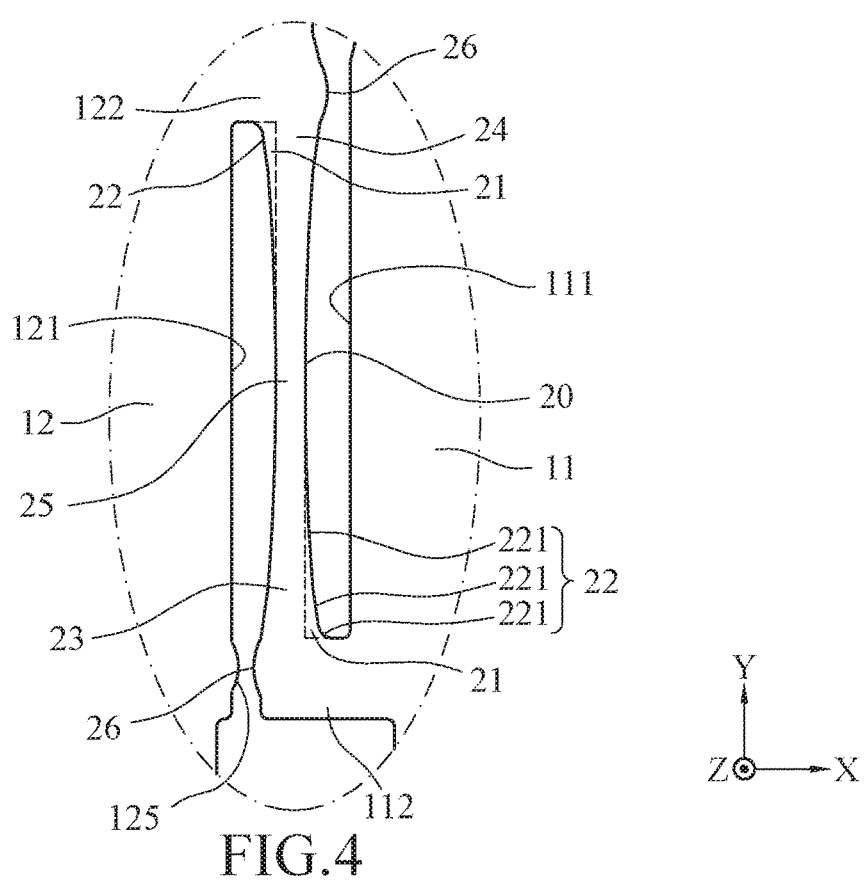
FIG. 4 illustrates an enlarged partial view of an elastic bridge member shown in FIG. 3.

As shown in FIGS. 2 to 4. FIG. 3 illustrates an enlarged partial view of FIG. 2. FIG. 4 illustrates an enlarged partial view of an elastic bridge member shown in FIG. 3. Taking the first plate 11 and the second plate 12 of the substrate 10 as an example, the first plate 11 has a first side edge 111 near the long slit C, the second plate 12 has a second side edge 121 near the long slit C, the first side edge 111 and the second side edge 121 are opposite to each other, and a gap G is between the first side edge 111 and the second side edge 121. Similarly, because of the long slit D, a gap G is between the second plate 12 and the third plate 13, repeated descriptions are omitted.

In some embodiments, as shown in FIGS. 2 and 3, each of the long slits C, D comprises at least one elastic bridge connection member (in this embodiment, the long slit comprises a plurality of elastic bridge members 20 and a plurality of elastic bridge components 30). The elastic bridge connection members are connected between the first plate 11 and the second plate 12 and connected between the second plate 12 and the third plate 13, respectively. Taking the long slit C as an example, the plurality of elastic bridge members 20 and the plurality of elastic bridge components 30 are disposed in the plurality of Y direction sections $C_Y$ of the long slit C. Hence, the relative positons of the first plate 11 and the second plate 12 can be adjusted relative to each other during the assembling process, but embodiments are not limited thereto. In some embodiments, each of the long slits C, D may have the elastic bridge members 20 only or the elastic bridge components 30 only, and the number or the position of the elastic bridge member 20 (or the elastic bridge component 30) can be adjusted according to user requirements.

As shown in FIGS. 2 to 4, taking the first plate 11 and the second plate 12 as an example, the first plate 11 can be moved relative to the second plate 12 in an X direction, so that the first plate 11 comes close to the second plate 12 or leaves away from the second plate 12 (in this embodiment, the X direction is the X axis direction of the figures and the X direction is coplanar with the substrate 10). When the first plate 11 is moved away from the second plate 12 in the X direction, the gap G between the first plate 11 and the second plate 12 increases. Conversely, when the first plate 11 is moved toward the second plate 12 in the X direction, the gap G between the first plate 11 and the second plate 12 decreases. The first side edge 111 of the first plate 11 comprises a first bridge seat 112, and the first bridge seat 112 is extending toward the second side edge 121 but not in contact with the second side edge 121. The second side edge 121 of the second plate 12 comprises a second bridge seat 122, and the second bridge seat 122 is extending toward the first side edge 111 but not in contact with the first side edge 111. Moreover, the first bridge seat 112 and the second bridge seat 122 are in a misalignment with each other; for instance, as shown in the figures, the first bridge seat 112 is not aligned with the second bridge seat 122 in the Y axis direction. The elastic bridge member 20 is extending in the Y direction and connected between the first bridge seat 112 and the second bridge seat 122. The Y direction in this embodiment indicates a direction perpendicular to the X direction (in this embodiment, the Y direction is the Y axis direction of the figures), and the Y direction is coplanar with the substrate 10. It is understood that, in this embodiment, the substrate 10 is a rectangular plate. Hence, the first plate 11 can be moved relative to the second plate 12 in the X direction (in this embodiment, the X direction is parallel to the long side of the substrate 10) to prevent the long side of the substrate 10 from having an excessive tolerance and causing difficulties in product assembly for the keyboard device 1.

Please refer to FIGS. 2 to 4. In this embodiment, the elastic bridge member 20 has a middle portion 25, a first end 23, and a second end 24 opposite to the first end 23. The middle portion 25 is between the first end 23 and the second end 24. The first end 23 is connected to the first bridge seat 112, and the second end 24 is connected to the second bridge seat 122. Accordingly, in this embodiment, the first bridge seat 112, the second bridge seat 122, and the elastic bridge member 20 together form a Z-shape structure. In some embodiments, the first bridge seat 112, the second bridge seat 122, and the elastic bridge member 20 may be plates integrally formed with the substrate 10. For example, the substrate 10 may be stamped to form the long slit C, and the first bridge seat 112, the second bridge seat 122, and the elastic bridge member 20 are unremoved portions of the substrate 10.

Figure 5:
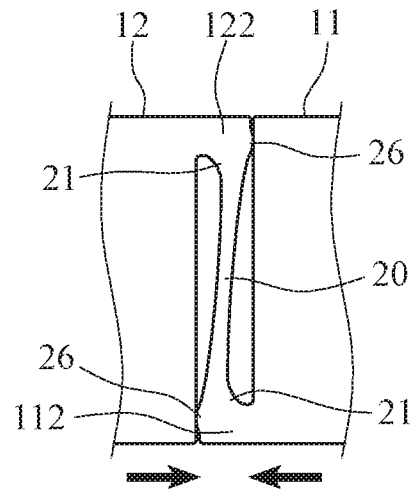
FIG. 5 illustrates an operational view of an elastic bridge member according to an exemplary embodiment of the instant disclosure.
Figure 6:
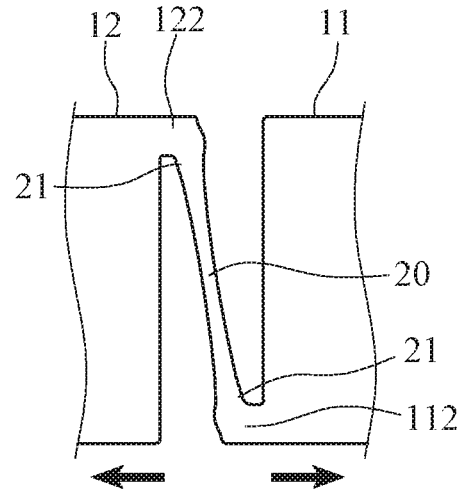
FIG. 6 illustrates another operational view of the elastic bridge member of the exemplary embodiment.

In some embodiments, as shown in FIGS. 4 to 6, during the assembly of the substrate 10, the first plate 11 and the second plate 12 may be moved relative to each other in the X axis direction (as shown in FIGS. 5 and 6, the first plate 11 and the second plate 12 can be moved toward or away from each other in the X axis direction), so that the relative positions of the first plate 11 and the second plate 12 can be adjusted. Moreover, during the relative movements of the first plate 11 and the second plate 12, the connection portion between the elastic bridge member 20 and the first bridge seat 112 and the connection portion between the elastic bridge member 20 and the second bridge seat 122 are forced to perform elastic deformations, so that instead of the first plate 11 being detached off the second plate 12, the elastic bridge member 20 can still be connected to the first plate 11 and the second plate 12 after the first plate 1 and the second plate 12 are moved. Accordingly, the first plate 11 and the second plate 12 of the substrate 10 can be moved relative to each other to adjust the positions of the first plate 11 and the second plate 12, such that the accumulated tolerance of the keyboard device 1 (for instance, the tolerance generated on the substrate 10, keycap 50, or other components during the manufacturing process of the keyboard device 1) can be eliminated. Therefore, the assembly precision of the keyboard device 1 is not affected by the accumulated tolerance. Moreover, in a similar manner, the second plate 12 and the third plate 13 can be moved relative to each other to adjust the positions of the second plate 12 and the third plate 13, and repeated descriptions are omitted.

In some embodiments, with reference to FIGS. 4 to 6, the elastic bridge member 20 further has at least one wedge portion 21. In this embodiment, the elastic bridge member 20 has two wedge portions 21 (as indicated by the region enclosed with dashed line shown in FIG. 4). The two wedge portions 21 are integrally formed at two opposite ends of the elastic bridge member 20 and respectively connected to an inner corner between the elastic bridge member 20 and the first bridge seat 112 and to an inner corner between the elastic bridge member 20 and the second bridge seat 122. Hence, the inner corner between the elastic bridge member 20 and the first bridge seat 112 does not form a sharp angle (right angle or acute angle), and the inner corner between the elastic bridge member 20 and the second bridge seat 122 does not form a sharp angle, either. Accordingly, as shown in FIGS. 5 and 6, when the connection portion between the elastic bridge member 20 and the first bridge seat 112 is forced to perform elastic deformation, the stress can be prevented from being focused at the inner corner between the elastic bridge member 20 and the first bridge seat 112. Similarly, when the connection portion between the elastic bridge member 20 and the second bridge seat 122 is forced to perform elastic deformation, the stress can be prevented from being focused at the inner corner between the elastic bridge member 20 and the second bridge seat 122. Accordingly, the stress at the inner corners can be greatly reduced to prevent the elastic bridge member 20 from being broken easily or from exceeding the elasticity limit.

As shown in FIG. 4, in some embodiments, the wedge portion 21 of the elastic bridge member 20 further has a curved edge 22. For example, the curved edge 22 may be a logarithmic curved edge, a parabolic curved edge, a hyperbolic curved edge, or other nonlinear curved edges. Hence, the inner corner between the elastic bridge member 20 and the first bridge seat 112 form a smooth curve to further reduce the stress at the inner corner, but embodiments are not limited thereto. Similarly, the inner corner between the elastic bridge member 20 and the second bridge seat 122 form a smooth curve to further reduce the stress at the inner corner, but embodiments are not limited thereto. In some embodiments, each wedge portion 21 of the bridge elastic member 20 may have a linear edge. Hence, the inner corner between the elastic bridge member 20 and the first bridge seat 112 forms an obtuse angle, thereby reducing the stress at the inner corner. Similarly, the inner corner between the elastic bridge member 20 and the second bridge seat 122 forms an obtuse angle, thereby reducing the stress at the inner corner.

As shown in FIG. 4, in this embodiment, the curved edge 22 of each wedge portion 21 of the elastic bridge member 20 is formed by at least two radius-angle curved edges 221 (in this embodiment, three radius-angle curved edges 221). Furthermore, the radius-angle curved edge 221 of the at least two radius-angle curved edges 221 near the first bridge seat 112 (or the second bridge seat 122) has a smaller radius of curvature. In other words, in this embodiment, the curved edge 22 of each wedge portion 21 is formed by connecting several radius-angle curved edges 221 having different radiuses of curvature with one another. Moreover, the radius of curvature of the curved edge 22 increases gradually from the end portion toward the middle portion 25 of the elastic bridge member 20. Hence, the inner corner between the elastic bridge member 20 and the first bridge seat 112 forms a smooth curve, thereby reducing the stress at the inner corner. Similarly, the inner corner between the elastic bridge member 20 and the second bridge seat 122 forms a smooth curve, thereby reducing the stress at the inner corner. In some embodiments, the curved edge 22 of each wedge portion 21 may be an equal radius-angle curved edge; in other words, the curved edge 22 may be formed by a single radius-angle curved edge 221.

In some embodiments, as shown in FIG. 4, the width of the middle portion 25 of the elastic bridge member 20 may be less than the width of the first end 23, and the width of the middle portion 25 of the elastic bridge member 20 may be less than the width of the second end 24. For example, in this embodiment, two sides of the middle portion 25 may be concave shaped and respectively connected to the curved edges 22 of the wedge portions 21. Hence, the section from the inner corner between elastic bridge member 20 and the first bridge seat 112 to the middle portion 25 forms a smooth curve, and the section from the inner corner between the elastic bridge member 20 and the second bridge seat 122 to the middle portion 25 forms a smooth curve as well, thereby facilitating the delivery of the stress.

As shown in FIG. 4, at least one stopping portion 26 is further protruding from the elastic bridge member 20, so that the elastic bridge member 20 can be stopped by the stopping portion 26 before the elastic bridge member 20 exceeds the elasticity limit. For instance, in this embodiment, two stopping portions 26 are protruding from the elastic bridge member 20, and the two stopping portions 26 are respectively at opposite sides of the two wedge portions 21 but not in contact with the first side edge 111 and the second side edge 121. Accordingly, as shown in FIG. 5, when the first plate 11 and the second plate 12 are moved toward each other, the first plate 11 and the second plate 12 can be stopped by the two stopping portions 26 (in this embodiment, the two stopping portions 26 are respectively abutted against the first side edge 111 and the second side edge 121). Hence, the elastic bridge member 20 can be prevented from exceeding the elastic deformation range.

In some embodiments, as shown in FIG. 4, a stopping portion 125 may be protruding from the second side edge 121 of the second plate 12 to correspond to the first bridge seat 111 but not to contact the first bridge seat 111. Furthermore (or alternatively), a stopping portion (omitted here) may be protruding from the first side edge 111 of the first plate 11 to correspond to the second bridge seat 122 but not to contact the second bridge seat 122. Hence, when the first plate 11 and the second plate 12 move toward each other, the first plate 11 and the second plate 12 can further be stopped by the stopping portion(s) 125 to prevent the elastic bridge member 20 from exceeding the elasticity limit.

Figure 7:
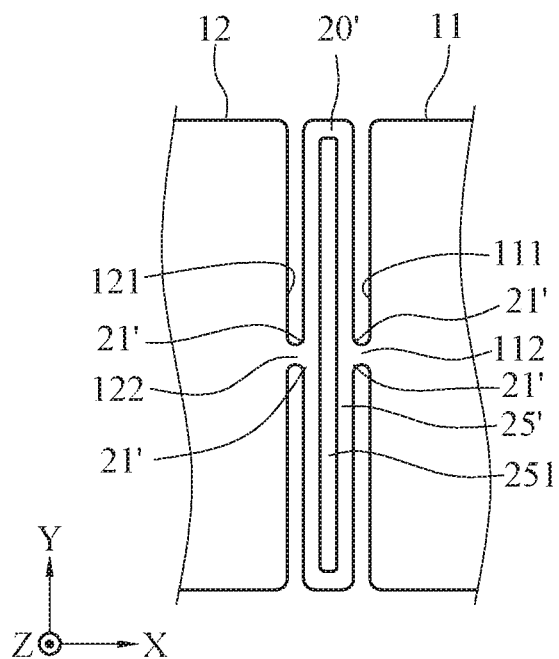
FIG. 7 illustrates an enlarged partial view of an elastic bridge member according to another exemplary embodiment of the instant disclosure.
Figure 8:
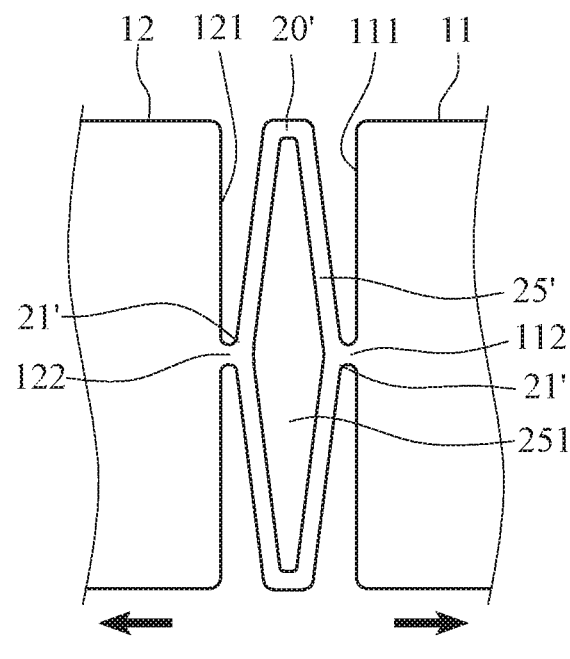
FIG. 8 illustrates an operational view of the elastic bridge member of the exemplary embodiment shown in FIG. 7.

Please refer to FIGS. 7 and 8. FIG. 7 illustrates an enlarged partial view of an elastic bridge member according to another exemplary embodiment of the instant disclosure. FIG. 8 illustrates an operational view of the elastic bridge member of the exemplary embodiment shown in FIG. 7. In this embodiment, the middle portion 25' of the elastic bridge member 20' has an elongated hollowed hole 251. The elongated hollowed hole 251 is extending in the Y axis direction. The first bridge seat 112 and the second bridge seat 122 are respectively connected to two opposite sides of the middle portion 25' of the elastic bridge member 20. Accordingly, as shown in FIG. 8, during the movements of the first plate 11 and the second plate 12 (here, FIG. 8 illustrates that the first plate 11 and the second plate 12 are moved away from each other). The middle portion 25' of the elastic bridge member 20' is forced to perform elastic deformation and to expand. Therefore, instead of the first plate 11 being detached off the second plate 12, the elastic bridge member 20' can still be connected to the first plate 11 and the second plate 12 after the first plate 11 and the second plate 12 are moved.

Again, as shown in FIGS. 7 and 8, the elastic bridge member 20' further has a plurality of wedge portions 21'. The plurality of wedge portions 21' is respectively connected to the inner corner between the elastic bridge member 20' and the first bridge seat 112 and to the inner corner between the elastic bridge member 20' and the second bridge seat 122. The structure of the wedge portion 21' of the elastic bridge member 20' in this embodiment may be the same as or similar to the structure of the wedge portion 21 of the elastic bridge member 20 in the foregoing embodiments. For example, in this embodiment, the wedge portion 21' of the elastic bridge member 20' has an equal radius-angle curved edge. Therefore, the inner corner between the elastic bridge member 20' and the first bridge seat 112 forms a smooth curve, thereby reducing the stress at the inner corner. Similarly, the inner corner between the elastic bridge member 20' and the second bridge seat 122 forms a smooth curve, thereby reducing the stress at the inner corner. It is understood that the configuration of the wedge portion 21' is not limited to the foregoing embodiments. In some embodiments, the edge of the wedge portion 21' may be a logarithmic curved edge, a parabolic curved edge, a hyperbolic curved edge, or other nonlinear curved edges.

Figure 9:
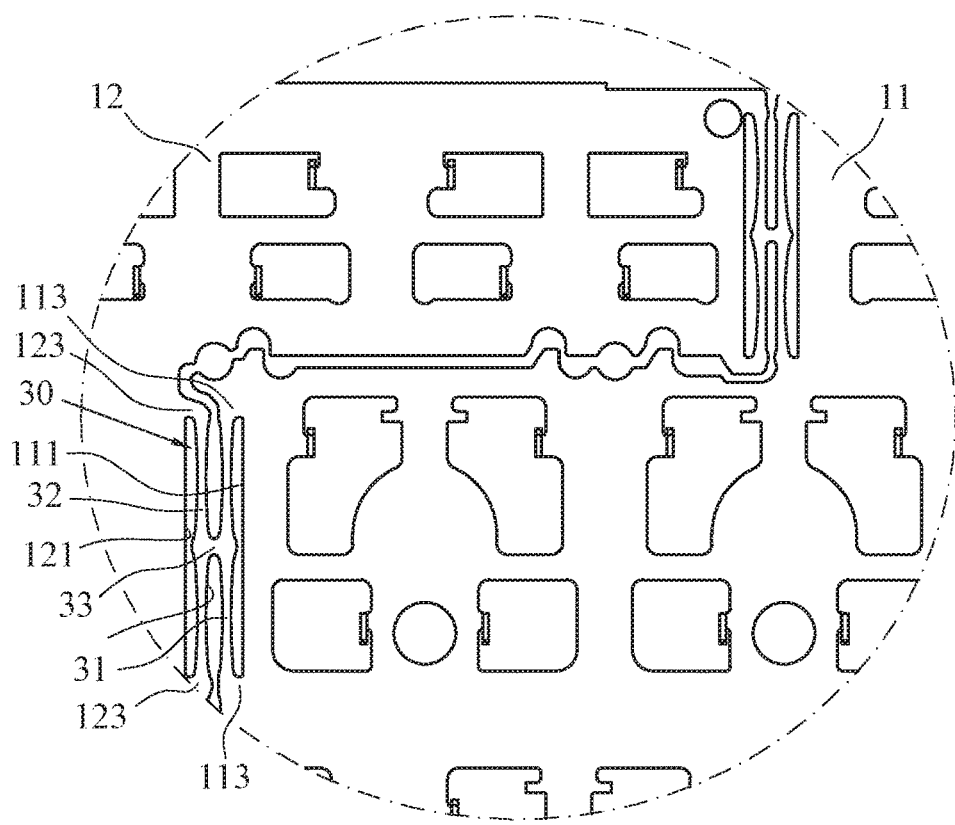
FIG. 9 illustrates another enlarged partial view of FIG. 2.
Figure 10:
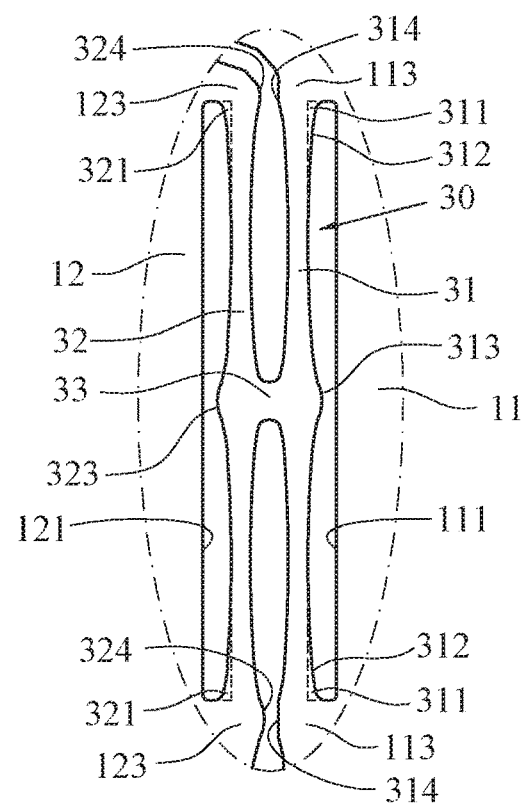
FIG. 10 illustrates an enlarged partial view of an elastic bridge component shown in FIG. 9.

Please refer to FIGS. 2, 9, and 10. FIG. 9 illustrates an enlarged partial view of the B region in FIG. 2. FIG. 10 illustrates an enlarged partial view of an elastic bridge component shown in FIG. 9. In this embodiment, the first side edge 111 of the first plate 11 comprises two first bridge connections 113. The two first bridge connections 113 are respectively extending toward the second side edge 121 but not in contact with the second side edge 121. Similarly, the second side edge 121 of the second plate 12 comprises two second bridge connections 123. The two second bridge connections 123 are respectively extending toward the first side edge 111 but not in contact with the first side edge 111. The two first bridge connections 113 and the two second bridge connections 123 respectively correspond to each other and a space is between each of the first bridge connections 113 and the corresponding second bridge connection 123. The elastic bridge component 30 comprises a first elastic bar 31, a second elastic bar 32, and a connecting element 33. In this embodiment, the first elastic bar 31 is extending in the Y axis direction and connected between the two first bridge connections 113, the second elastic bar 32 is extending in the Y axis direction and connected between the two second bridge connections 123. The connecting element 33 is connected between the middle section of the first elastic bar 31 and the middle section of the second elastic bar 32. Hence, the elastic bridge component 30 forms an H-shape structure. It is understood that, the middle section of the first elastic bar 31 is a section of the first elastic bar 31 between the two first bridge connections 113, and the middle section of the second elastic bar 32 is a section of the second elastic bar 32 between the two second bridge connections 123, and the number and the positions of the connecting element 33 can be adjusted according to actual requirements.

In some embodiments, the two first bridge connections 113, the two second bridge connections 123, and the elastic bridge component 30 may be plates integrally formed with the substrate 10. For example, the substrate 10 may be stamped to form the long slit C, and the two first bridge connections 113, the two second bridge connections 123, and the elastic bridge component 30 are unremoved portions of the substrate 10.

Figure 11:
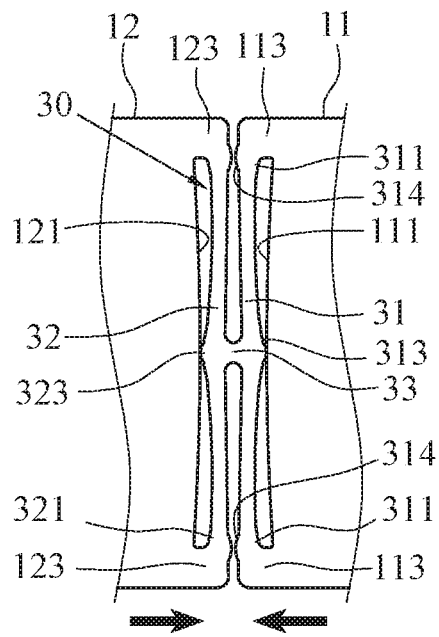
FIG. 11 illustrates an operational view of an elastic bridge component according to an exemplary embodiment of the instant disclosure.
Figure 12:
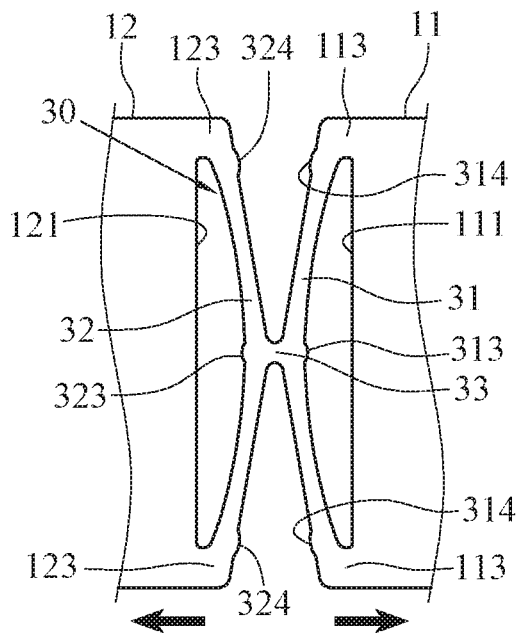
FIG. 12 illustrates another operational view of the elastic bridge component of the exemplary embodiment shown in FIG. 11.

Accordingly, as shown in FIGS. 11 and 12, during the movements of the first plate 11 and the second plate 12 (for instance, the first plate 11 and the second plate 12 may be moved toward or away from each other), the middle section of the first elastic bar 31 and the middle section of the second elastic bar 32 of the elastic bridge component 30, connection portions between the first elastic bar 31 and each of the first bridge connections 113, and connection portions between the second elastic bar 32 and each of the second bridge connections 123 are forced to perform elastic deformation. Hence, instead of the first plate 11 being detached off the second plate 12, the elastic bridge component 30 can still be connected to the first plate 11 and the second plate 12 after the first plate 1 and the second plate 12 are moved. Consequently, the assembly precision of the keyboard device 1 is not affected by the manufacturing tolerance. Moreover, since the elastic bridge component 30 suffers the force (stress) with several points (portions), the stress can be properly dispersed over the elastic bridge component 30, rather than the stress being focused at a certain portion of the elastic bridge component 30. Therefore, the elastic bridge component 30 can be prevented from being broken easily or from exceeding the elasticity limit.

In some embodiments, as shown in FIG. 10, the first elastic bar 31 of the elastic bridge component 30 has at least one wedge portion 311. In this embodiment, the first elastic bar 31 of the elastic bridge component 30 has two wedge portions 311 (as indicated by the region enclosed with dashed line shown in FIG. 10). The two wedge portions 311 are at two opposite ends of the first elastic bar 31 and respectively connected to inner corners between the first elastic bar 31 and each of the first bridge connections 113. Hence, the inner corners between the first elastic bar 31 and each of the first bridge connections 113 do not form a sharp angle (right angle or acute angle). Accordingly, as shown in FIGS. 11 and 12, when the connection portions between the first elastic bar 31 and each of the first bridge connections 113 are forced to perform elastic deformation, the stress can be prevented from being focused at the inner corners between the first elastic bar 31 and each of the first bridge connections 113. Accordingly, the stress at the inner corners can be greatly reduced to prevent the elastic bridge component 30 from being broken easily or from exceeding the elasticity limit.

In some embodiments, as shown in FIG. 10, the wedge portion 311 of the first elastic bar 31 further has a curved edge 312. The configuration of the curved edge 312 may be the same as or similar to the curved edge 22 of the wedge portion 21 of the elastic bridge member 20 in the foregoing embodiments. For example, the curved edge 312 of the wedge portion 311 of the first elastic bar 31 may be a logarithmic curved edge, a parabolic curved edge, a hyperbolic curved edge, or other nonlinear curved edges. Alternatively, the curved edge 312 of the wedge portion 311 may be formed by connecting several radius-angle curved edges having different radiuses of curvature with one another. Moreover, the radius of curvature of the curved edge 312 increases gradually from the end portion toward the middle section of the first elastic bar 31. Hence, the inner corners between the first elastic bar 31 and each of the first bridge connections 113 respectively form smooth curves, thereby reducing the stress at the inner corners. In some embodiments, the curved edge 312 of the wedge portion 311 may have a linear edge. Hence, the inner corners between the first elastic bar 31 and each of the first bridge connections 113 form obtuse angles, thereby reducing the stress at the inner corners.

In some embodiments, as shown in FIG. 10, the second elastic bar 32 of the elastic bridge component 30 may have two wedge portions 321 (as indicated by the region enclosed with dashed line shown in FIG. 10). The two wedge portions 321 are at two opposite ends of the second elastic bar 32 and respectively connected to inner corners between the second elastic bar 32 and each of the second bridge connections 123. It is understood that, the structure and the function of the wedge portion 321 of the second elastic bar 32 may be the same as or similar to those of the wedge portion 311 of the first elastic bar 31, repeated descriptions are thus omitted.

In some embodiments, as shown in FIGS. 10 to 12, a plurality of stopping flanges 313, 314 is protruding from the first elastic bar 31 of the elastic bridge component 30. The stopping flange 313 is protruding from the middle section of the first elastic bar 31, and the wedge portion 311 and the stopping flange 313 are located at the same side of the first elastic bar 31. Each of the two stopping flanges 314 and the corresponding wedge portion 311 are located at opposite sides of the first elastic bar 31. Therefore, when the first plate 11 and the second plate 12 are moved relative to each other, the first plate 11 and the second plate 12 can be stopped by the plurality of stopping flanges 313, 314 before the elastic bridge component 30 exceeds the elasticity limit. In some embodiments, a plurality of stopping flanges 323, 324 may be protruding from the second elastic bar 32, thereby improving the stopping performance; repeated descriptions are omitted.

Figure 13:
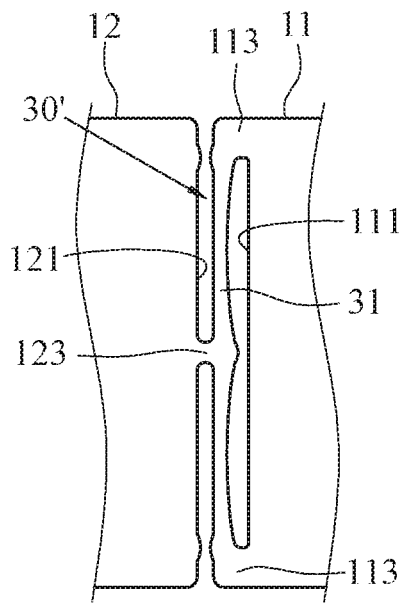
FIG. 13 illustrates an enlarged partial view of an elastic bridge component according to another exemplary embodiment of the instant disclosure.
Figure 14:
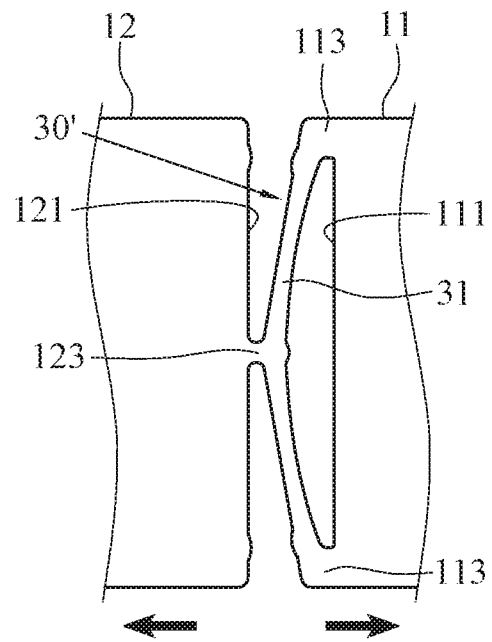
FIG. 14 illustrates an operational view of the elastic bridge component of the exemplary embodiment shown in FIG. 13.

In some embodiments, as shown in FIGS. 13 and 14, another embodiment of the elastic bridge component 30' is illustrated. FIG. 13 illustrates an enlarged partial view of an elastic bridge component according to another exemplary embodiment of the instant disclosure. FIG. 14 illustrates an operational view of the elastic bridge component of the exemplary embodiment shown in FIG. 13. In this embodiment, the elastic bridge component 30' only has the first elastic bar 31 connecting to the two first bridge connections 113; in other words, in this embodiment, the elastic bridge component 30' does not have the second elastic bar and the connecting element. Moreover, one second bridge connection 123 is protruding from the second side edge 121 of the second plate 12 and connected to the middle section of the first elastic bar 31. Accordingly, during the movements of the first plate 11 and the second plate 12, the middle section of the first elastic bar 31 of the elastic bridge component 30' and the connection portions between the first elastic bar 31 and each of the first bridge connections 113 are forced to perform elastic deformation. Therefore, under such configuration, the elastic bridge component 30' suffers the force (stress) with several points, and the stress can be properly dispersed over the elastic bridge component 30', rather than the stress being focused at a certain portion of the elastic bridge component 30'. Therefore, the elastic bridge component 30' can be prevented from being broken easily or from exceeding the elasticity limit.

In some embodiments, stopping member(s) may be additionally assembled on the substrate 10 of the keyboard device 1 to prevent the elastic bridge member 20 and the elastic bridge component 30 from exceeding the elastic deformation range. Different embodiments are to be provided with drawing in the following paragraphs.

Figure 15:
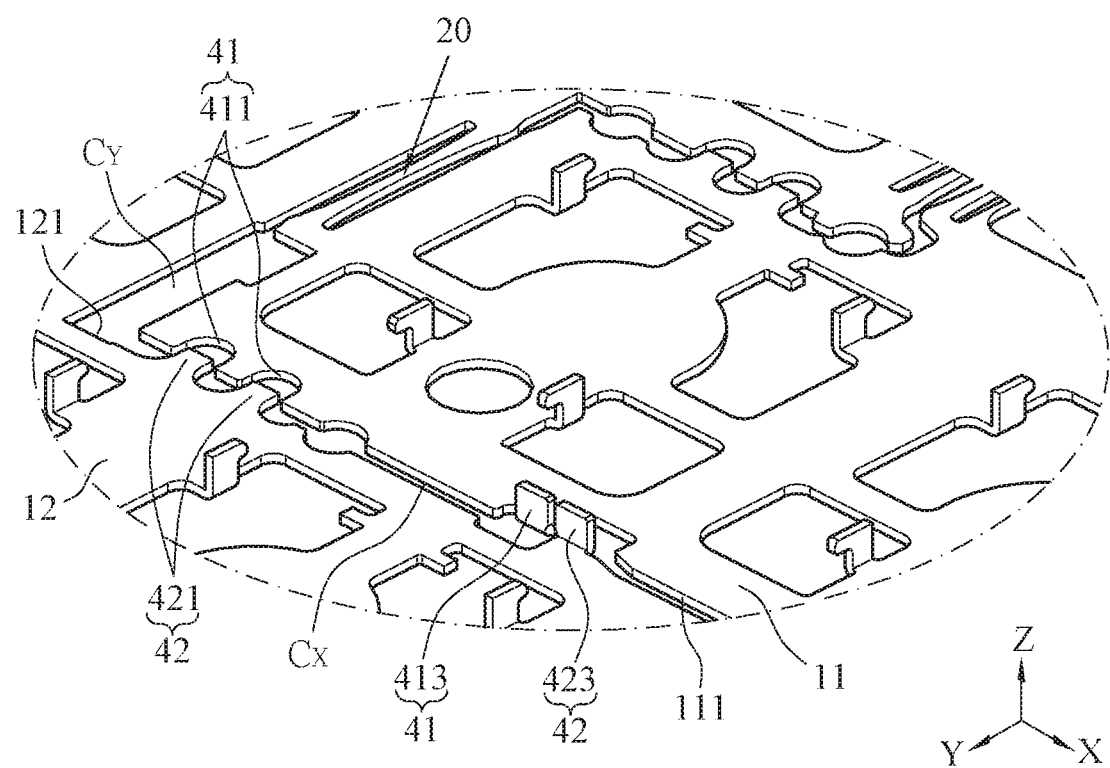
FIG. 15 illustrates an enlarged partial view of a stopping member according to a first embodiment of the instant disclosure.

Please refer to FIG. 15. FIG. 15 illustrates an enlarged partial view of the A' region in FIG. 1, and the A' region corresponds to the A region shown in FIGS. 2 and 3. As shown in FIGS. 2, 3, and 15, the first side edge 111 of the first plate 11 comprises a first stopping member 41, and the second side edge 121 of the second plate 12 comprises a second stopping member 42. The first stopping member 41 and the second stopping member 42 are aligned along a same direction (in this embodiment, along the X axis direction), and a certain interval S is between the first stopping member 41 and the second stopping member 42. The certain interval S is less than the gap G between the first side edge 111 and the second side edge 121 (as shown in FIG. 3). Hence, the elastic bridge member 20 and the elastic bridge component 30 can be stopped by the first stopping member 41 and the second stopping member 42 before the elastic bridge member 20 and the elastic bridge component 30 exceed the elasticity limit.

As shown in FIGS. 2, 3, and 15, in this embodiment, the first stopping member 41 and the second stopping member 42 are disposed in the X direction section $C_x$ of the long slit C, but embodiments are not limited thereto. Specifically, in one embodiment, the first stopping member 41 comprises a plurality of grooves 411 and a first standing plate 413. The plurality of grooves 411 is recessed from the first side edge 111 and away from the second side edge 121. The first standing plate 413 is integrally formed with the first side edge 111, and the first standing plate 413 is bent and extending from the first side edge 111. The second stopping member 42 comprises a plurality of protruding sheets 421 and a second standing plate 423. The plurality of protruding sheets 421 is integrally extending toward the first side edge 111 from the second side edge 121, and each of the protruding sheets 421 is extending toward the corresponding groove 411 and not in contact with the corresponding groove 411. The second standing plate 423 is integrally formed with the second side edge 121, and the second standing plate 423 is bent and extending from the second side edge 121. The certain interval S is between the edge of each of the protruding sheets 421 and the edge of the corresponding groove 411. The first standing plate 413 and the second standing plate 423 are aligned along the X axis direction, and the certain interval S is between the first standing plate 413 and the second standing plate 423.

Accordingly, as shown in FIGS. 5 to 8 and FIGS. 11 to 14, when the first plate 11 and the second plate 12 are moved relative to each other, the first plate 11 and the second plate 12 can be stopped by the protruding sheets 421 and the grooves 411 as well as the first standing plate 413 and the second standing plate 423 in the X axis direction. Hence, the elastic bridge member 20 and the elastic bridge component 30 can be prevented from exceeding the elasticity limit. For example, in this embodiment, when the first plate 11 and the second plate 12 moved toward each other, the first plate 11 and the second plate 12 can be stopped by the protruding sheets 421 and the grooves 411 as well as the first standing plate 413 and the second standing plate 423 at the same time. Moreover, since the first standing plate 413 and the second standing plate 423 are bent and extending from the substrate 10, the areas the portions of the first plate 11 and the second plate 12 stopped by the first standing plate 1413 and the second standing plate 423 can further increase so as to prevent the misalignment between the first plate 11 and the second plate 12. On the other hand, when the first plate 11 and the second plate 12 are moved away from each other, the first plate 11 and the second plate 12 can be stopped by the protruding sheets 421 and the grooves 411, so that the elastic bridge member 20 and the elastic bridge component 30 can be prevented from exceeding the elastic limit.

Figure 16:
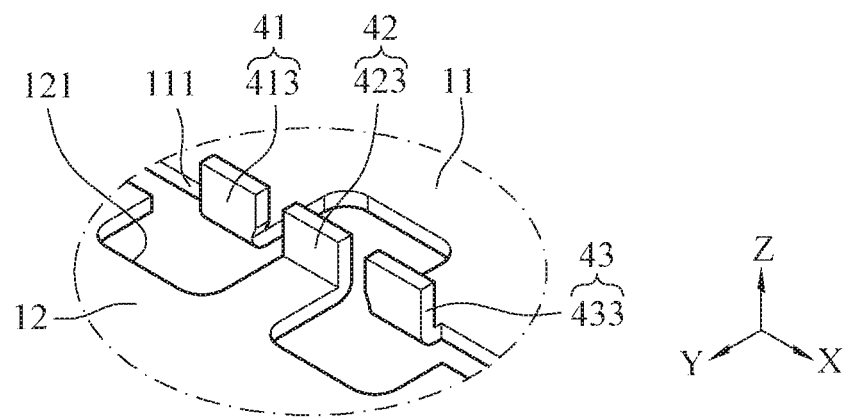
FIG. 16 illustrates an enlarged partial view of a stopping member according to a second embodiment of the instant disclosure.
Figure 17:
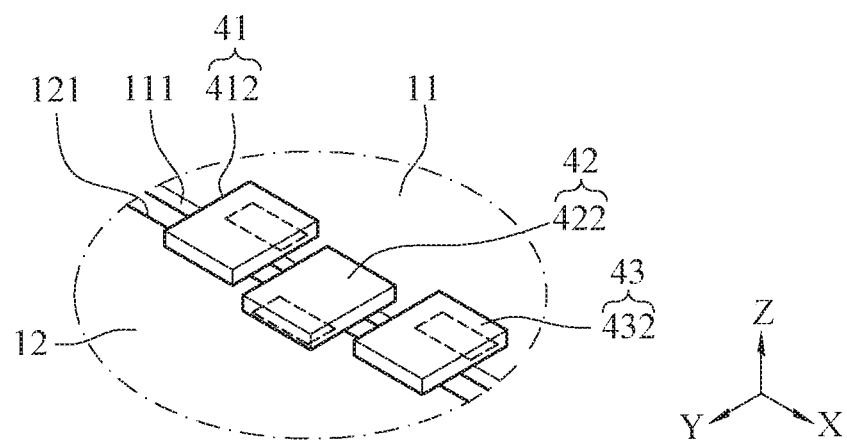
FIG. 17 illustrates an enlarged partial view of a stopping member according to a third embodiment of the instant disclosure.
Figure 18:
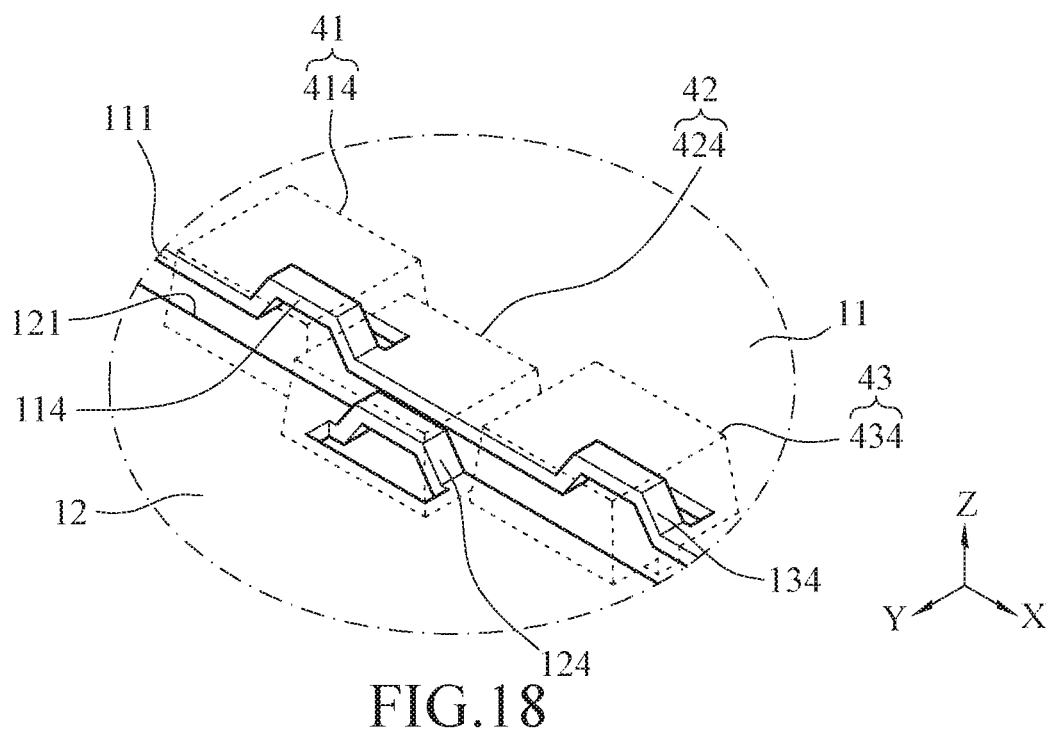
FIG. 18 illustrates an enlarged partial view of a stopping member according to a fourth embodiment of the instant disclosure.

In some embodiments, as shown in FIGS. 16 to 18, the first side edge 111 of the first plate 11 further comprises a third stopping member 43. The second stopping member 42 is between the first stopping member 41 and the third stopping member 43. The first stopping member 41, the second stopping member 42, and the third stopping member 43 are aligned along the X direction (in this embodiment, along the X axis direction). The certain interval S is between the third stopping member 43 and the second stopping member 42 (as shown in FIG. 3). Accordingly, no matter the first plate 11 and the second plate 12 are moved toward or away from each other, the first plate 11 and the second plate 12 can be stopped by the first stopping member 41, the second stopping member 43, and the third stopping member 43. Hence, the elastic bridge member 20 and the elastic bridge component 30 can be prevented from exceeding the elasticity limit. For example, when the first plate 11 and the second plate 12 are moved toward each other, the first stopping member 41 and the second stopping member 42 are moved toward each other, so that the first stopping member 41 and the second stopping member 42 are abutted against each other to provide the stopping function. Conversely, when the first plate 11 and the second plate 12 are moved away from each other, the second stopping member 42 and the third stopping member 43 are moved toward each other, so that the second stopping member 42 and the third stopping member 43 are abutted against each other to provide the stopping function.

Please refer to FIG. 16. FIG. 16 illustrates an enlarged partial view of a stopping member according to a second embodiment of the instant disclosure. As compared with the embodiment shown in FIG. 15, in this embodiment, the first stopping member 41 comprises a first standing plate 413 integrally formed with the first side edge 111 of the first plate 11, and the first standing plate 413 is bent and extending from the first side edge 111 of the first plate 11. The second stopping member 42 comprises a second standing plate 423 integrally formed with the second side edge 121 of the second plate 12, and the second standing plate 423 is bent and extending from the second side edge 121 of the second plate 12. The third stopping member 43 comprises a third standing plate 433 integrally formed with the first side edge 111 of the first plate 11, and the third standing plate 433 is bent and extending from the first side edge 111 of the first plate 11. The first standing plate 413, the second standing plate 423, and the third standing plate 433 are aligned along the X axis direction. The certain interval S is between the first standing plate 413 and the second standing plate 423, and the certain interval S is also between the second standing plate 423 and the third standing plate 433.

Please refer to FIG. 17. FIG. 17 illustrates an enlarged partial view of a stopping member according to a third embodiment of the instant disclosure. In this embodiment, the first stopping member 41 comprises a first protruding plate 412, and the first protruding plate 412 is disposed on the first side edge 111 and protruding toward the second side edge 121. The second stopping member 42 comprises a second protruding plate 422, and the second protruding plate 422 is disposed on the second side edge 121 and protruding toward the first side edge 111. The third stopping member 43 comprises a third protruding plate 432, and the third protruding plate 432 is disposed on the first side edge 111 and protruding toward the second side edge 121. The first protruding plate 412, the second protruding plate 422, and the third protruding plate 432 are aligned along the X axis direction. The certain interval S is between the first protruding plate 412 and the second protruding plate 422, and the certain interval S is also between the second protruding plate 422 and the third protruding plate 432.

Moreover, as shown in FIG. 17, in this embodiment, the first protruding plate 412 and the third protruding plate 432 are fixedly stacked on the surface of the first plate 11. For example, an end portion of the first protruding plate 412 and an end portion of the third protruding plate 432 are disposed on the surface of the first plate 11 by gluing, soldering, or locking. Similarly, in this embodiment, the second protruding plate 422 is fixedly stacked on the surface of the second plate 12. For example, an end portion of the second protruding plate 422 is disposed on the surface of the second plate 12 by gluing, soldering, or locking. However, it is understood that, in some embodiments, the first protruding plate 412 and the third protruding plate 432 may be integrally extending from the first side edge 111, and the second protruding plate 422 may be integrally extending from the second side edge 121.

Furthermore, as shown in FIG. 17, in some embodiments, the first protruding plate 412 and the third protruding plate 432 may be further extending to the surface of the second plate 12, and the second protruding plate 422 may be further extending to the surface of the first plate 11. Therefore, the first plate 11 can be stopped by the second protruding plate 422, and the movement of the first plate 11 in the Z axis direction can be properly limited by the second protruding plate 422. Similarly, the second plate 12 can be stopped by the first protruding plate 412 and the third protruding plate 432, and the movement of the second plate 12 in the Z axis direction can be properly limited by the first protruding plate 412 and the third protruding plate 432.

Figure 19:
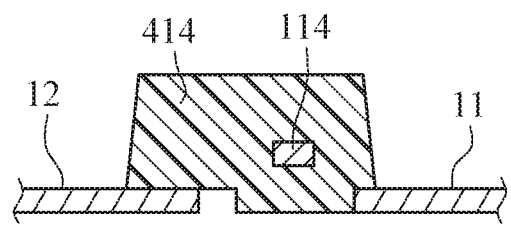
FIG. 19 illustrates a cross-sectional view of the stopping member of the fourth embodiment.
Figure 20:
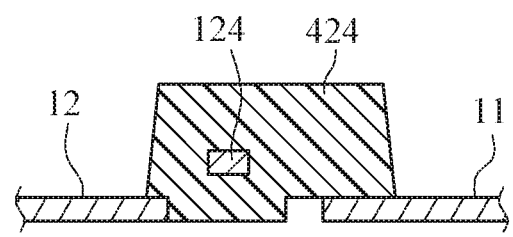
FIG. 20 illustrates another cross-sectional view of the stopping member of the fourth embodiment.

Please refer to FIGS. 18 to 20. FIG. 18 illustrates an enlarged partial view of a stopping member according to a fourth embodiment of the instant disclosure. FIG. 19 illustrates a cross-sectional view of the stopping member of the fourth embodiment. FIG. 20 illustrates another cross-sectional view of the stopping member of the fourth embodiment. In this embodiment, the first stopping member 41 comprises a first stopping block 414, the first side edge 111 comprises a first fixing member 114, and the first fixing member 114 is adapted to fix the first stopping block 414 on the first side edge 111. Similarly, in this embodiment, the second stopping member 42 comprises a second stopping block 424, the second side edge 121 comprises a second fixing member 124, and the second fixing member 124 is adapted to fix the second stopping block 424 on the second side edge 121. Similarly, in this embodiment, the third stopping member 43 comprises a third stopping block 434, the first side edge 111 further comprises a third fixing member 134, and the third fixing member 134 is adapted to fix the third stopping block 434 on the first side edge 111. Moreover, the first stopping block 414, the second stopping block 424, and the third stopping block 434 are aligned along the X axis direction. The certain interval S is between the first stopping block 414 and the second stopping block 424, and the certain interval S is also between the second stopping block 424 and the third stopping block 434.

As shown in FIGS. 18 to 20, in this embodiment, the first fixing member 114 and the third fixing member 134 are bent plates formed by stamping the first side edge 111 of the first plate 11, and the second fixing member 124 is a bent plate formed by stamping the second side edge 121 of the second plate 12. The first stopping block 414 and the third stopping block 434 may be made of plastics and respectively assembled with the first fixing member 114 and the third fixing member 134 by insert molding techniques. As shown in FIG. 19, in this embodiment, the first stopping block 414 is engaged with and covering the first fixing member 114. Similarly, in this embodiment, the second stopping block 424 may be assembled with the second fixing member 124 by insert molding techniques. As shown in FIG. 20, in this embodiment, the second stopping block 424 is engaged with and covering the second fixing member 124. It is understood that, in some embodiments, the first stopping block 414, the second stopping block 424, and the third stopping block 434 may be respectively fixed on the first fixing member 114, the second fixing member 124, and the third fixing member 134 by ways of, for example, gluing, soldering, or locking.

Further, as shown in FIGS. 18 to 20, in some embodiments, the first stopping block 414 and the third stopping block 434 are further extending to the surface of the second plate 12, and the second stopping block 424 is further extending to the surface of the first plate 11. Hence, the first plate 11 can be stopped by the second stopping block 424, and the movement of the first plate 11 in the Z axis direction can be properly limited by the second stopping block 424. Similarly, the second plate 12 can be stopped by the first stopping block 414 and the third stopping block 434, and the movement of the second plate 12 in the Z axis direction can be properly limited by the first stopping block 414 and the third stopping block 434.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A keyboard device, comprising:
a substrate; and
a plurality of keycaps disposed on the substrate;
wherein the substrate comprises a long slit and an elastic bridge component, and the long slit divides the substrate into a first plate and a second plate; the first plate has a first side edge, and the second plate has a second side edge; the first side edge and the second side edge are opposite to each other, and a gap is between the first side edge and the second side edge; the elastic bridge component is connected between the first side edge and the second side edge, and the first plate is movable relative to the second plate;
wherein the first side edge comprises two first bridge connections respectively extending toward the second side edge, and the second side edge comprises two second bridge connections respectively extending toward the first side edge;
wherein the elastic bridge component comprises a first elastic bar, a second elastic bar, and a connecting member, the first elastic bar is connected between the two first bridge connections, the second elastic bar is connected between the two second bridge connections, and the connecting member is connected between the first elastic bar and the second elastic bar.

2. The keyboard device according to claim 1, wherein the long slit has at least one X direction section and at least one Y direction section, the substrate has a long side and a short side; the long side is parallel to the at least one X direction section, the short side is parallel to the at least one Y direction section, and the elastic bridge component is disposed in the at least one Y direction section.

3. The keyboard device according to claim 1, wherein the first elastic bar further comprises a wedge portion, and the wedge portion is connected to an inner corner between the first elastic bar and one of the two first bridge connections.

4. The keyboard device according to claim 3, wherein the wedge portion has a curved edge.

5. The keyboard device according to claim 4, wherein the curved edge is a logarithmic curved edge, a parabolic curved edge, or a hyperbolic curved edge.

6. The keyboard device according to claim 4, wherein the curved edge comprises at least two radius-angle curved edges, and a radius-angle curved edge of the at least two radius-angle curved edges near one of the two first bridge connections has a smaller radius of curvature.

7. The keyboard device according to claim 3, wherein a stopping flange is further protruding from the first elastic bar; the stopping flange and the wedge portion are located at opposite sides of the first elastic bar.

8. The keyboard device according to claim 3, wherein a stopping flange is further protruding from the first elastic bar; the stopping flange and the wedge portion are located at a same side of the first elastic bar.

9. The keyboard device according to claim 1, wherein the first side edge comprises a first stopping member, the second side edge comprises a second stopping member, the first stopping member and the second stopping member are aligned along a same direction and a certain interval is between the first stopping member and the second stopping member.

10. The keyboard device according to claim 9, wherein the first stopping member comprises a groove recessed from the first side edge and away from the second side edge, the second stopping member comprises a protruding sheet integrally extending toward the first side edge from the second side edge, the protruding sheet is extending toward the groove and not in contact with the groove.

11. The keyboard device according to claim 9, wherein the first stopping member comprises a first protruding plate disposed on the first side edge and protruding toward the second side edge, the second stopping member comprises a second protruding plate disposed on the second side edge and protruding toward the first side edge.

12. The keyboard device according to claim 11, wherein the first protruding plate is fixedly stacked on a surface of the first plate, and the second protruding plate is fixedly stacked on a surface of the second plate.

13. The keyboard device according to claim 12, wherein the first protruding plate is further extending to the surface of the second plate.

14. The keyboard device according to claim 9, wherein the first stopping member comprises a first standing plate bent and extending from the first side edge.

15. The keyboard device according to claim 14, wherein the second stopping member comprises a second standing plate bent and extending from the second side edge, and the certain interval is between the first standing plate and the second standing plate.

16. The keyboard device according to claim 9, wherein the first stopping member comprises a first stopping block, the first side edge comprises a first fixing member, and the first fixing member fixes the first stopping block on the first side edge; the second stopping member comprises a second stopping block, the second side edge comprises a second fixing member, and the second fixing member fixes the second stopping block on the second side edge.

17. The keyboard device according to claim 16, wherein the first stopping block is further extending to a surface of the second plate.

18. The keyboard device according to claim 9, wherein the first side edge further comprises a third stopping member, the second stopping member is between the first stopping member and the third stopping member; the first stopping member, the second stopping member, and the third stopping member are aligned along a same direction, a second certain interval is between the third stopping member and the second stopping member.

19. A keyboard device, comprising:
a substrate; and
a plurality of keycaps disposed on the substrate;
wherein the substrate comprises a long slit and an elastic bridge component, and the long slit divides the substrate into a first plate and a second plate; the first plate has a first side edge, and the second plate has a second side edge; the first side edge and the second side edge are opposite to each other, and a gap is between the first side edge and the second side edge; the elastic bridge component is connected between the first side edge and the second side edge, and the first plate is movable relative to the second plate;
wherein the first side edge comprises two first bridge connections respectively extending toward the second side edge, and the second side edge comprises a second bridge connection extending toward the first side edge;
wherein the elastic bridge component comprises an elastic bar connected between the two first bridge connections, and the second bridge connection is connected to the elastic bar.

20. The keyboard device according to claim 19, wherein the elastic bar further comprises a wedge portion, and the wedge portion is connected to an inner corner between the elastic bar and one of the two first bridge connections.

21. The keyboard device according to claim 20, wherein the wedge portion has a curved edge.

22. The keyboard device according to claim 21, wherein the curved edge is a logarithmic curved edge, a parabolic curved edge, or a hyperbolic curved edge.

23. The keyboard device according to claim 21, wherein the curved edge comprises at least two radius-angle curved edges, and a radius-angle curved edge of the at least two radius-angle curved edges near one of the first bridge connections has a smaller radius of curvature.

24. The keyboard device according to claim 20, wherein a stopping flange is further protruding from the elastic bar; the stopping flange and the wedge portion are located at a same side of the elastic bar.

25. The keyboard device according to claim 19, wherein the long slit has at least one X direction section and at least one Y direction section, the substrate has a long side and a short side; the long side is parallel to the at least one X direction section, the short side is parallel to the at least one Y direction section, and the elastic bridge component is disposed in the at least one Y direction section.

* * * * *